United States Patent [19]

Eimer et al.

[11] 4,311,591
[45] Jan. 19, 1982

[54] FILTER FOR SEPARATING SOLID BODIES FROM A FLUID STREAM

[75] Inventors: Klaüs Eimer; Heinz Thal, both of Ratingen; Dieter Mindel, Duisburg, all of Fed. Rep. of Germany

[73] Assignee: Ludwig Taprogge Reinigungsanlagen für Röhren-Wärmeaustauscher, Düsseldorf, Fed. Rep. of Germany

[21] Appl. No.: 168,753

[22] Filed: Jul. 11, 1980

[30] Foreign Application Priority Data

Jul. 12, 1979 [DE] Fed. Rep. of Germany ....... 2928093

[51] Int. Cl.³ ............................................. B01D 35/22
[52] U.S. Cl. .................................. 210/405; 210/421; 210/456
[58] Field of Search ................ 210/405, 435, 420–423, 210/456

[56] References Cited

U.S. PATENT DOCUMENTS

| | | | |
|---|---|---|---|
| 3,789,992 | 2/1974 | Treplin et al. | 210/405 |
| 3,828,930 | 8/1974 | Eimer et al. | 210/421 X |
| 3,875,063 | 4/1975 | Treplin et al. | 210/456 X |
| 4,202,777 | 5/1980 | Schall | 210/405 |

FOREIGN PATENT DOCUMENTS

2058395 3/1973 Fed. Rep. of Germany .
2225727 7/1973 Fed. Rep. of Germany .

*Primary Examiner*—Thomas G. Wyse

*Attorney, Agent, or Firm*—Karl F. Ross

[57] ABSTRACT

A filter for separating solid bodies such as fish from a liquid stream such as flowing water to be used as a coolant for a power-generating plant comprises a cylindrical housing, an inlet conduit attached to a cylindrical wall of the housing substantially radially thereto, a first outlet conduit connected to a bottom end of the housing for drawing off filtrate, a second outlet conduit connected to the cylindrical housing wall opposite the inlet conduit for channeling away fish-laden effluent, a wedge disposed at the junction of the inlet conduit and the housing for dividing an incoming fluid stream into two equal portions, a filter sieve eccentrically disposed in the housing for forming therewith an annular filter chamber including tapered chamber halves of decreasing width in the direction of fluid flow, and a pair of independently actuatable gate flaps swingably mounted on the wedge for pivoting between respective closed positions engaging the housing and respective fully open positions engaging the sieve. The housing is provided with a trap region at the solids outlet, a plurality of pipe sections connecting the annular filter chamber to the second outlet conduit; the pipe sections contribute to creating eddies at the solids outlet at least in part for cleaning the outer sieve surface during a steady-state operation of the filter. Further steady-state turbulence may be induced by the formation of projections at the free ends of the gate flaps.

14 Claims, 4 Drawing Figures

FILTER FOR SEPARATING SOLID BODIES FROM A FLUID STREAM

CROSS-REFERENCE TO RELATED APPLICATION

The present application is related to out concurrently filed U.S. patent application Ser. No. 168,752.

FIELD OF THE INVENTION

Our present invention is related to a filter for separating solid objects from a fluid stream. More particularly, our present invention is related to a filter for separating bodies such as mollusk shells and fish from a stream of water to be used, for example, in cooling a power-generating plant.

BACKGROUND OF THE INVENTION

Devices for separating solid objects from a stream of water to be used in cooling a power-generating plant generally comprise a substantially cylindrical separator housing, a radially oriented inlet channel, a filtrate-outlet conduit or pipe connected to the bottom of the housing and an outlet conduit attached to a cylindrical wall of the housing for drawing off the filtered-out solid objects. A cylindrical sieve disposed in the housing forms therewith a substantially annular outer filter chamber communicating with the inlet channel and the solids-outlet conduit, while the space inside the filter sieve communicates with the filtrate-outlet pipe. A gating or valve flap is provided in the inlet channel proximate to the housing for regulating the velocity and mass flow of the incoming fluid stream.

As described and illustrated in German patent document (Auslegeschrift) No. 2,058,395, a single valve flap is swingably mounted in the inlet channel proximate to the junction of the same and the housing for pivoting about an axis parallel to a vertically extending axis of symmetry of the filter sleeve, the solids-outlet conduit being attached to the cylindrical housing wall substantially tangentially thereto and to the annular outer filter chamber. A pair of guide plates spaced from the valve flap may be rigidly fixed thereto, as shown and described in German patent document (Auslegeschrift) No. 2,225,727, for directing the incoming water stream in a tangential direction with respect to the filter sieve and for accelerating the water to a minimum velocity preferably greater than two meters per second. At inlet stream velocities less than two meters per second, the cleaning effects precipitously decrease.

Because of the tangential orientation of the solids-outlet conduit, there is a preferred direction and path of fluid flow, whereby different portions of the outer surface of the sieve cannot be equally well cleaned of adhering objects such as mussels. Furthermore, the annular motion of the incoming water stream about the water sieve causes a whirlpool or vortex therein, this vortex leading to pressure and energy losses and yet in no way contributing to the cleaning of the sieve. To reduce these pressure losses in practice, the valve flap is generally maintained in an intermediate position and is pivoted for short intervals to effect an intermittent sieve cleaning.

In such a method of separator operation, difficulties arise if the number of solid objects in the arriving fluid stream suddenly increases, such as if a school of fish swims into the inlet conduit or a bank of mussels drops from the conduit walls. In such situations, the filter is blocked before the valve flap can be pivoted to a cleaning position.

Another disadvantage of conventional separators is the injury and killing of fish, owing to the discontinuous separator operation and to the high stream velocities involved.

OBJECTS OF THE INVENTION

An object of our present invention is to provide a filter or separator of the above-mentioned type in which pressure and energy losses are minimized.

Another object of our present invention is to provide such a filter which can effectively operate at inlet fluid-stream speeds of less than one meter per second.

Yet another object of our present invention is to provide such a filter which even in steady-state or continuous operation implements a cleaning action on the outer surface of the filter sieve.

A more particular object of our present invention is to provide a filter of the above-mentioned type which can purify water streams of large numbers of solid bodies such as fish without damaging or injuring the fish.

SUMMARY OF THE INVENTION

A filter for separating solid bodies such as fish and mollusks from a fluid stream such as flowing water comprises according to out preset invention a substantially cylindrical separator housing, an inlet conduit, a first outlet conduit, a second outlet conduit, a filter sieve, a divider for separating and incoming fluid stream into two substantially equal portions and a gating assembly disposed in the housing at the inlet conduit, i.e. at the junction of the inlet conduit and the housing, for regulating fluid flow thereinto. The housing has a pair of end walls which are preferably circular and a cylindrical wall having an axis of symmetry, the inlet conduit and the second outlet conduit being attached to the housing at substantially opposite sides of the cylindrical wall and having a substantially radial orientation with respect to the housing. The filter sieve is disposed in the housing to form an inner chamber communicating with the first outlet conduit and an outer chamber, between the cylindrical housing wall and the sieve, communicating at one end with the inlet conduit and at an opposite end with the second outlet conduit; the sieve has an axis of symmetry extending parallel to the housing's symmetry axis. The gating assembly includes a pair of independently actuatable flaps hingedly mounted in the housing at the inlet for pivoting about respective rotation axes parallel to the housing symmetry axis and the sieve symmetry axis. The two stream portions produced by the divider enter the outer filter chamber and flow along respective halves thereof toward the second outlet conduit. Water forced through the sieve into the inner chamber exits the filter via the first outlet conduit which is connected to an end of the housing, while solids-laden effluent flow out through the second outlet conduit.

The symmetrical operation of a filter according to our present invention prevents the formation of a vortex or whirlpool inside the filter sieve, thereby reducing pressure and energy losses to a minimum during normal or steady-state operation.

According to a feature of our present invention, the gating flaps are each pivotable between an open position in which an end of the flap opposite the respective rotation axis engages the sieve and a closed position in which the free flap end engages the housing. Preferably, the sieve is cylindrical and the outer chamber is substantially annular.

According to further features of our present invention, the divider is a stream-guide body disposed in the inlet conduit at its mouth, i.e. proximate to the housing, the body projecting upstream for dividing the incoming stream into two equal portions. The gating flaps are advantageously connected to the body which may take the form of a wedge provided with a curved surface facing the sieve and having a radius of curvature substantially equal to the radius of the cylindrical housing wall. An additional flap is pivotably mounted on the wedge at the leading edge or vertex thereof, i.e. substantially opposite the wedge's curved surface and the independently actuatable gating flaps. The additional flap is pivotable between a pair of positions in which a free end of the additional flap engages respective walls of the inlet conduit. Opposite the curved wedge surface, the sieve is advantageously provided with a hole-free or smooth guide surface.

According to yet further features of our present invention, the outer filter chamber comprises a pair of chamber halves each having a width decreasing from the fluid inlet to the second conduit, the equal stream portions being guidable by the wedge and by the gate flaps into respective outer-chamber halves. Preferably, the tapering of these chamber halves is effectuated by eccentrically disposing the sieve in the housing, the axis of the sieve being located between the housing's symmetry axis and the outlet conduit.

A dead-water trap is provided in the housing at the second outlet conduit, a plurality of parallel pipe sections connecting the outer chamber to the second outlet conduit and extending radially into the trap. The pipe sections partially cause the formation of eddy currents in the region of the second outlet conduit. These eddies clean the outer surface of the filter sieve during a steady-state or continuous operation of a filter or separator according to out present invention and contribute to retaining the contaminant objects in the region of the second outlet conduit. Further cleaning action during steady-state operation may be attained via the inclusion of projections or flanges on the free ends of the gate flaps, such flanges introducing turbulence into the stream portions entering the outer-chamber halves.

It is advantageous that the inlet conduit, the housing, the dead-water trap, the sieve and the second outlet conduit have a common height, the pipe sections at the outlet being spaced from one another along the height of the trap. The preferred orientation of the filter is, then, vertical and the first outlet conduit is attached to the bottom of the housing.

Because a filter or separator according to our present invention has small pressure losses, it can be operated at low inlet water speeds, thereby minimizing injuries incurred by fish during transit thereby of the separator.

BRIEF DESCRIPTION OF THE DRAWING

These and other features of our present invention will now be described in detail, reference being made to the accompanying drawing in which.

SPECIFIC DESCRIPTION

Figure 1:
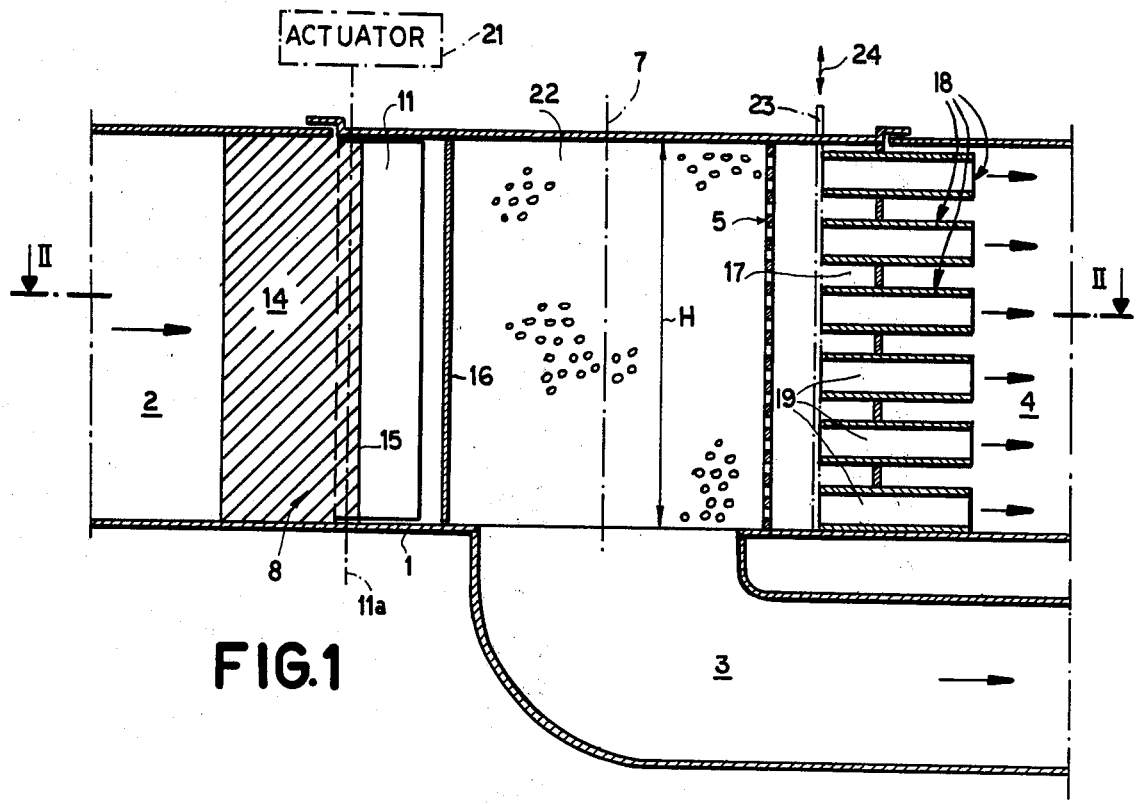
FIG. 1 is a cross-sectional view, taken along a vertical plane, of a filter according to our present invention.
Figure 2:
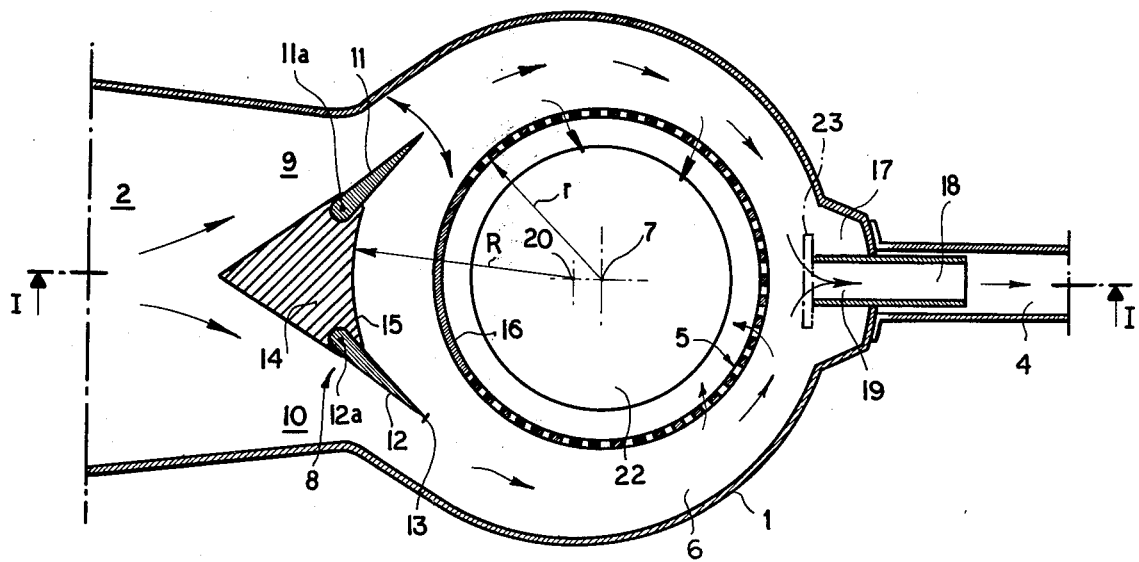
FIG. 2 is a cross-sectional view taken along line II—II in FIG. 1.

As illustrated in FIGS. 1 and 2, a filter or separator device for removing solid objects such as mollusk shells and fish from a stream of water to be used, for example, in cooling power-generating plants comprises a filter housing 1, an inlet conduit or pipe 2, a filtrate-outlet conduit or pipe 3 attached to a bottom wall of housing 1 and another outlet conduit 4 attached to a cylindrical wall or housing 1 substantially opposite inlet conduit 2, the latter outlet conduit serving to channel from housing 1 the solids filtered from the fluid stream entering the separator via feed pipe or inlet conduit 2.

A cylindrical filter sieve 5 is eccentrically disposed in housing 1 and defines therewith a substantially annular filtering chamber 6 communicating at one end with inlet conduit 2 and at an opposite end with outlet conduit or channel 4. Sieve 5 also defines a cylindrical inner space 22 communicating with filtrate-channeling pipe 3.

A gating assembly 8 mounted at the interface between housing 1 and inlet conduit 2 includes an elongate wedge 14 projecting into the inlet conduit for dividing an incoming fluid stream into two substantially equal portions 9 and 10 guidable by assembly 8 into respective halves of outer chamber 6. Wedge 14 has a curved surface 15 facing sieve 5 and having a radius of curvature R preferably equal to the radius of housing 1.

A pair of guide flaps 11 and 12 are hingedly mounted on wedge 14 at opposite ends of surface 15 for pivoting about respective rotation axes 11a and 12a which are parallel to an axis of symmetry 20 of housing 1. As described in detail hereinafter, flaps 11 and 12 are each swingable between an open position in which a free end of the flap, i.e. an end opposite the respective rotation axis, engages sieve 5 and a closed position in which the free flap end engages the cylindrical wall of housing 1. As schematically illustrated at 13 in FIG. 2, flaps 11 and 12 may be provided at their free ends with flanges or projections 13 for introducing turbulence into the associated portion of the incoming stream.

Sieve 5 has an axis of symmetry 7 located between symmetry axis 20 and outlet duct 4. Owing to the eccentric disposition of the sieve, the outer filter chamber 6 comprises a pair of chamber halves each having a width decreasing from inlet conduit 2 toward outlet duct 4, this decrease of chamber width contributing to an increase in fluid pressure in the region of the outlet duct. Sieve 5 is provided with a hole-free fluid-guide wall or surface 16 facing curved wedge surface 15 and substantially equal in length thereto. As indicated by radius arrows in FIG. 2, sieve 5 has a radius r less than curvature radius R.

Housing 1 has an extension in the region of the contaminant exit, i.e. outlet duct 4, for forming a dead-water sink or trap 17. A multiplicity of pipe sections 18 for forming a connection or bridge between chamber 6 and outlet duct 4 are inserted in the extension of housing 1 radially thereto and parallel to one another. The pipe sections have collet ends 19 projecting into trap 17 for cooperating therewith in causing the formation of eddies which serve to retain solid-matter contaminants in the exit region and to clean the outer surface of sieve 5 during a steady-state operation of the filter.

Preferably, inlet conduit 2, housing 1, sieve 5 and outlet duct 4 have a common height H, pipe sections 18 being spaced from one another along the height H of trap 17, and the filtrate outlet conduit 3 has a mouth or leading pipe section which is coaxial with sieve 5. Wedge 14 extends the entire height H of inlet conduit 2 to divide the same into a pair of canals channeling stream portions 9 and 10.

Pivots or rotation axes 11a and 12a of gating flaps 11 and 12 are located in or near a cylindrical locus including the vertically extending cylindrical wall of housing 1. Flaps 11 and 12 are connected preferably in the region of their pivots to an actuator 21 (FIG. 1) which may include handles or grips for manual operation of the gating assembly 8 or a reversible motor drive energized under the control of a programmer (not shown) which has sensor inputs indicating flow and loading conditions and the extent of solid impurities or contaminants in an incoming fluid stream.

Figure 3:
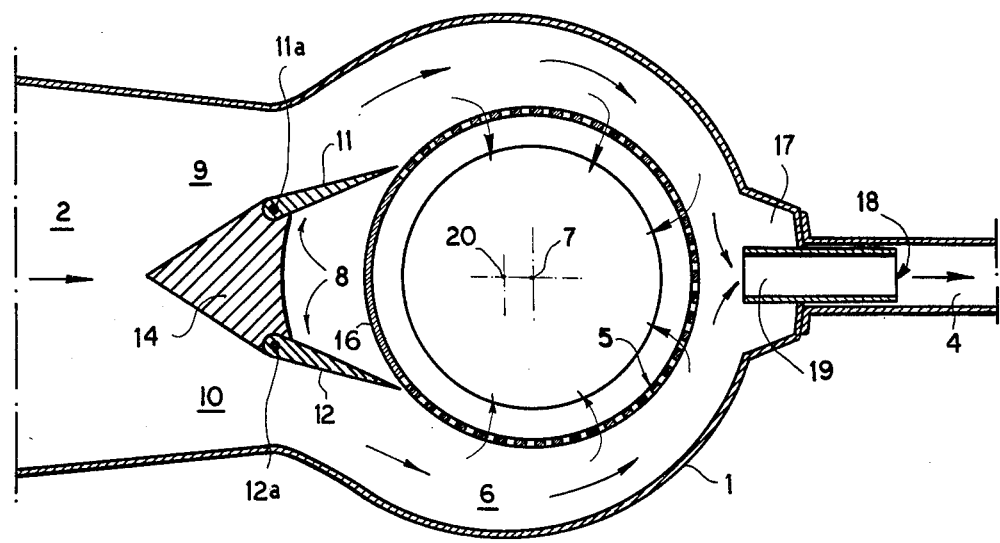
FIG. 3 is a view similar to FIG. 2, showing a different operational state of the filter.

As shown in FIG. 3, in a continuous operation of a separator according to our present invention gating flaps 11 and 12 are pivoted into open positions in which the free ends of the flaps engage sieve 5 at an outer surface thereof. An incoming fluid stream is divided by wedge 14 into stream portions 9 and 10 which flow into the respective tapered halves of outer filter chamber 6 toward outlet pipe sections 18. The narrowing of the outer-chamber halves increases the pressure of the stream portions, thereby forcing fluid through holes in sieve 5 into inner filter chamber 22, as indicated in FIG. 3 by the curved arrows traversing the sieve.

At least in part because of the symmetry of the water flow, no whirlpool or vortex is generated in chamber 22, whereby pressure losses are minimized. Such a minimization of the pressure gradient reduces stream velocities, especially the velocities of the incoming stream portions 9 and 10, and thereby minimizes injuries incurred in the separator by living organisms such as fish. Generally, the fish are trapped in eddies arising at deadwater sink 17 and partially owing to collects 19 and are subsequently swept away into outlet duct 4.

Figure 4:
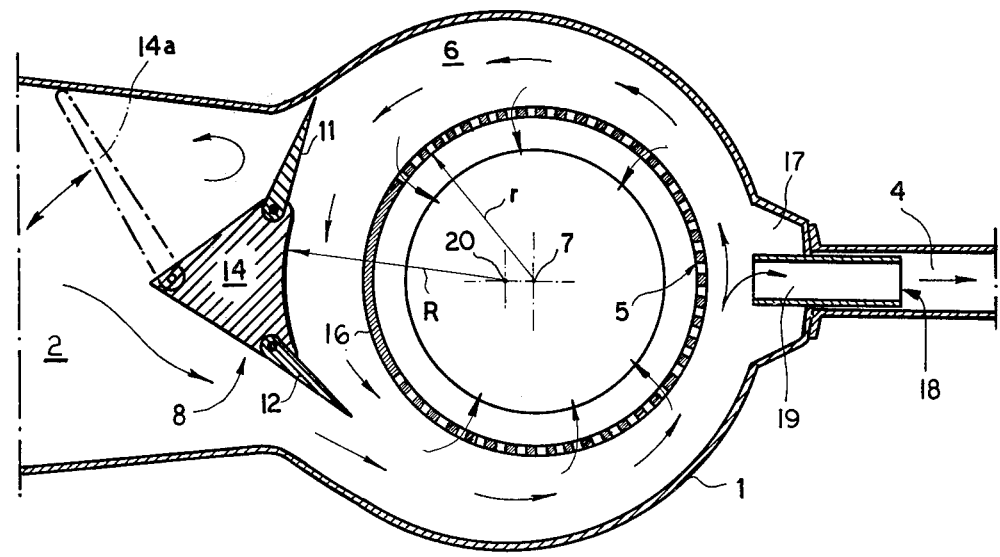
FIG. 4 is a view similar to FIGS. 2 and 3, showing yet another operational state of the filter.

A method of operating a separator to remove from the outside surface of sieve 5 matter clinging thereto, such as mollusks, comprises according to our present invention the step of pivoting one of the gating flaps 11, 12 to a closed position and the other flap to an intermediate position substantially centered between sieve 5 and housing 1, as indicated in FIG. 4. Such an orientation of gates 11 and 12 induces the formation of a circular flow in chamber 6. The hitherto-closed gate 11 is then swung to an intermediate position similar to that of gate 12, as shown in FIG. 2, whereby the annular flow is violently reversed at least in one half of chamber 6. Such a reversal involves or causes strong turbulence effects which cleanse the outer surface of the sieve. Gate 12 may then be closed while gate 11 remains in the intermediate position, another annular flow consequently arising in a direction opposite to that of the original flow. Upon the establishment of this renewed annular fluid motion, gate 12 is restored to the intermediate position, once again causing strong turbulence. The cycle may then be repeated.

For some continuous-operations circumstances, it may be desirable to maintain the flaps or gates 11 and 12 in the intermediate positions (FIG. 2), for example to introduce a certain amount of turbulence into the stream portions.

As illustrated in FIG. 4 it is advantageous to provide an additional gating flap 14a at the vertex or leading edge of wedge 14, such additional flap being swingably secured to wedge 14 for pivoting between a pair of closed positions in which a free end of the flap engages respective vertical walls of inlet conduit 2. Flap 14a is swung into its closed positions by actuator 21 in synchronism with the closing of gates 11 and 12. Thus, upon the closing of gate 11, flap 14a is actuated to engage the side wall of conduit 2 proximate to gate 11 (FIG. 4), while upon the opening of both gates 11 and 12, flap 14a is pivoted into an intermediate orientation pointing directly upstream.

As indicated by dot-dash lines in FIGS. 1 and 2, a separator according to our present invention may be provided with a shutter gate 23 vertically reciprocatable (arrow 24) in the region of connecting pipes 18 to block the flow from chamber 6 into outlet duct 4. Thus a pure or relatively contaminant-free incoming stream may be channeled totally into inner chamber 22 and thence to outlet conduit 3 for transport to a heat exchanger (not shown) and, possibly, to a pump, at a power-generating station. Such a steady-state operation of the separator may be periodically interrupted for cleaning the outer surface of the sieve 5 via the aforedescribed method of annular-flow reversals.

We claim:

1. A filter for separating solid bodies from a fluid stream, comprising:
   a substantially cylindrical separator housing having a pair of end walls and a cylindrical wall with a first axis of symmetry;
   an inlet conduit connected to said cylindrical wall and oriented substantially radially to said housing;
   a first outlet conduit connected to an end of said housing for channeling filtered fluid therefrom;
   a second outlet conduit connected to said cylindrical wall opposite said inlet conduit and oriented substantially parallel thereto for channeling from said housing solid contaminants separated by said filter from a fluid stream fed thereto via said inlet conduit;
   a filter sieve disposed in said housing to form an inner chamber communicating with said first outlet conduit and an outer chamber between said cylindrical wall and said sieve communicating at one end with said inlet conduit and at an opposite end with said second outlet conduit, said sieve having a second axis of symmetry extending parallel to said first axis;
   channeling means for dividing said fluid stream into two substantially equal portions;
   gating means disposed in said housing at said inlet conduit for regulating fluid flow into said outer chamber, said gating means including a pair of independently actuatable flaps hingedly mounted in said housing for pivoting about respective rotation axes parallel to said first and said second axis; and
   actuating means for pivoting said flaps.

2. The filter defined in claim 1 wherein each of said flaps is pivotable between an open position in which an end of the flap opposite the respective rotation axis engages said sieve and a closed position in which such end engages said housing.

3. The filter defined in claim 2 wherein said sieve is cylindrical and said outer chamber is substantially annular.

4. The filter defined in claim 3 wherein said channeling means includes a stream-guide body disposed in said inlet conduit at said housing and projecting upstream for dividing said fluid stream into said equal portions, said flaps being pivotably connected to said body.

5. The filter defined in claim 4 wherein said body has the form of a wedge and is provided with a curved surface facing said sieve and having a radius of curvature substantially equal to a radius of said cylindrical wall.

6. The filter defined in claim 5 wherein an additional flap is pivotably mounted on said wedge substantially opposite said curved surface and said independently actuatable flaps, said additional flap being pivotable between a pair of positions in which a free end of said additional flap engages respective walls of said inlet conduit.

7. The filter defined in claim 6 wherein said sieve is provided with a hole-free guide surface facing said curved surface.

8. The filter defined in claim 7 wherein said outer chamber comprises a pair of chamber halves each having a width decreasing from said inlet conduit toward said second outlet conduit, said equal portions of said fluid stream being guidable by said channeling means and said gating means into respective chamber halves.

9. The filter defined in claim 8 wherein said sieve is eccentrically disposed in said housing, said second axis being located between said first axis and said second outlet conduit.

10. The filter defined in claim 9 wherein a dead-water trap is provided in said housing at said second outlet conduit.

11. The filter defined in claim 10 further comprising at least one pipe section connecting said second outlet conduit and said outer chamber, said section projecting into said trap and being radially oriented with respect to said housing.

12. The filter defined in claim 10 wherein said inlet conduit, said housing, said sieve and said second outlet conduit have a common height, said first axis being vertical and said first outlet conduit being attached to a bottom end of said housing.

13. The filter defined in claim 12 wherein said trap extends the height of said housing, further comprising a plurality of spaced pipe sections connecting said outer chamber to said second outlet conduit, said pipe sections extending parallel to one another and into said trap.

14. The filter defined in claims 1, 4, 8, 9 or 10 wherein said independently actuatable flaps are provided at respective free ends with projections or flanges for introducing turbulence into said equal portions of said fluid stream.

* * * * *